April 11, 1950     O. C. BLOMGREN     2,503,993
ROTARY DISK AGITATOR FOR SOIL TILLERS
Filed May 31, 1946     2 Sheets-Sheet 1
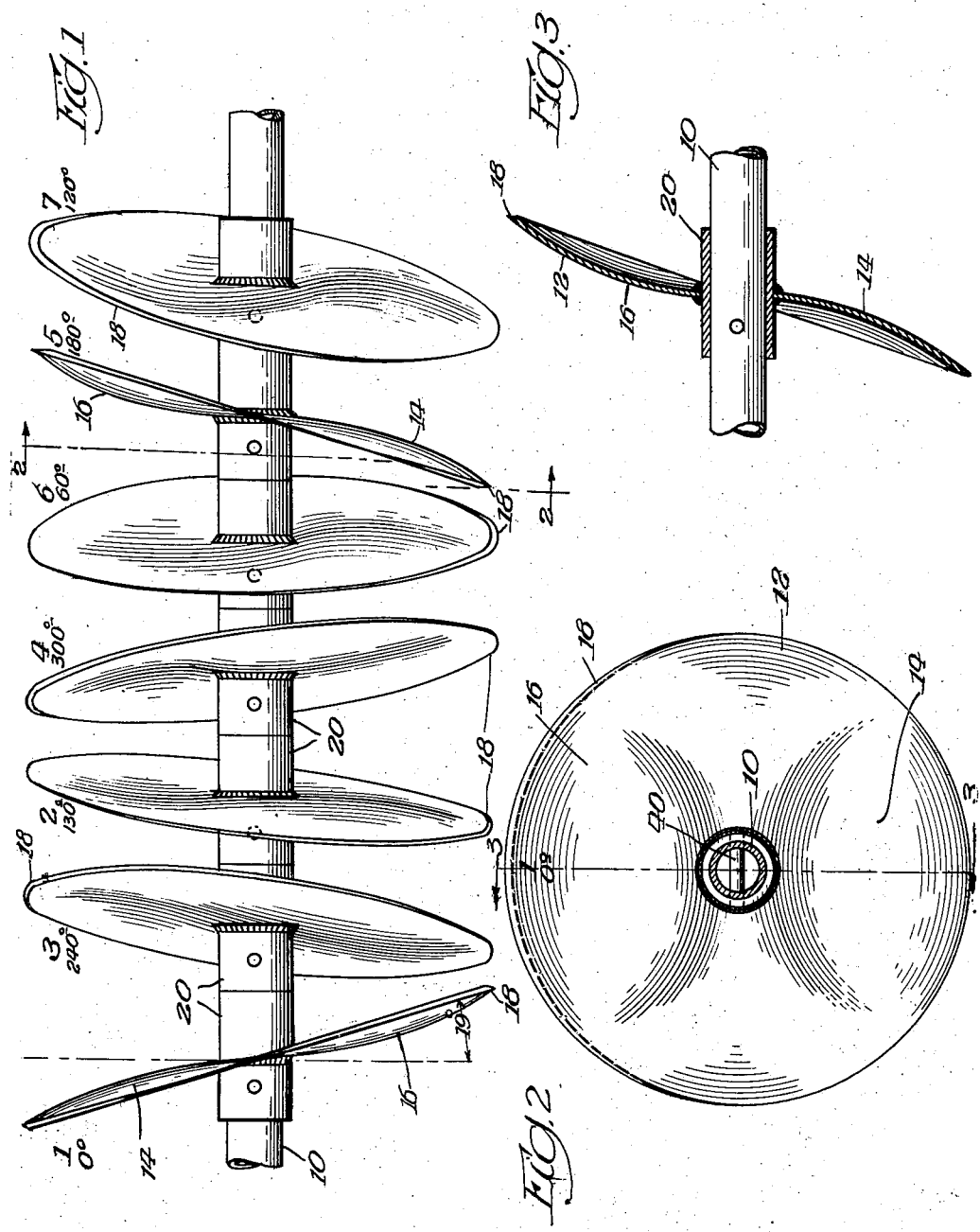

April 11, 1950     O. C. BLOMGREN     2,503,993
ROTARY DISK AGITATOR FOR SOIL TILLERS
Filed May 31, 1946     2 Sheets-Sheet 2
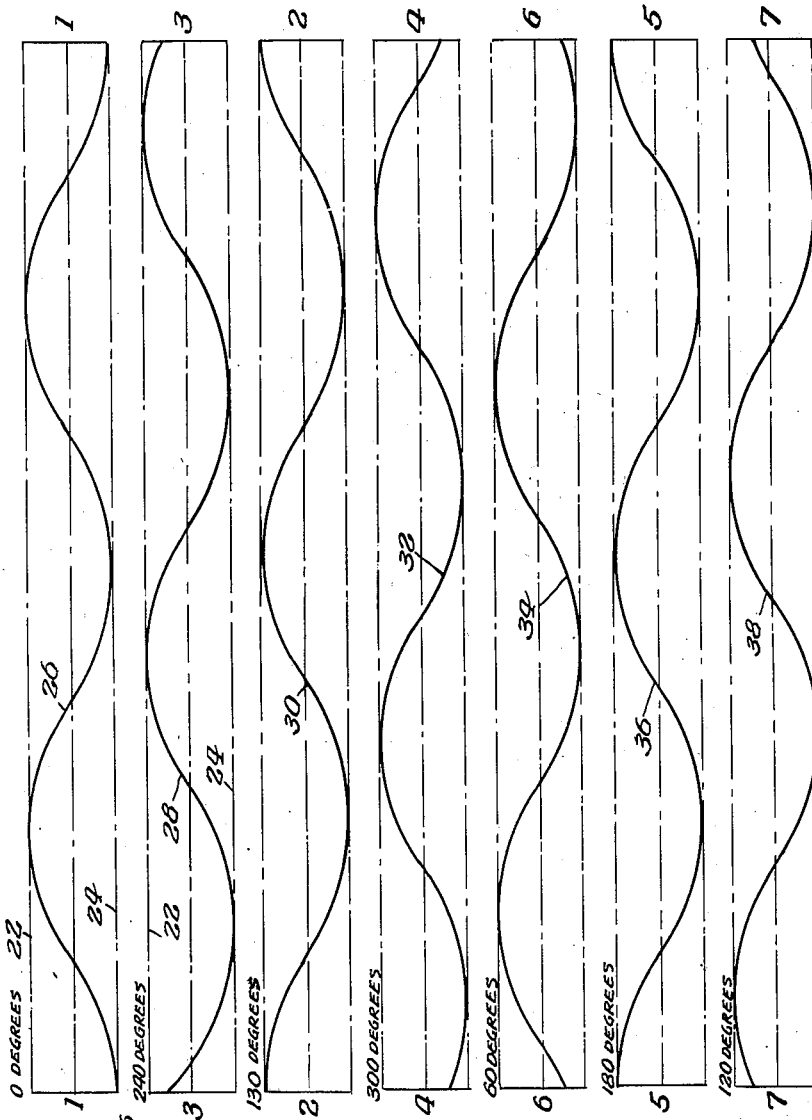
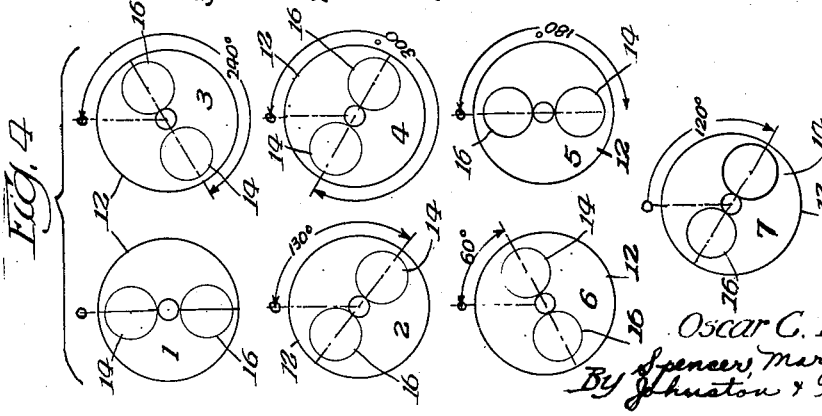
Inventor
Oscar C. Blomgren Patented Apr. 11, 1950

2,503,993

UNITED STATES PATENT OFFICE 2,503,993

ROTARY DISK AGITATOR FOR SOIL TILLERS

Oscar C. Blomgren, Evanston, Ill., assignor, by mesne assignments, to General Finance Corporation, a corporation of Michigan Application May 31, 1946, Serial No. 673,412

10 Claims. (Cl. 97—220)

This invention relates in general to a segmented type disc agitator and to the form and construction of the individual discs which, when assembled, made up the complete agitator.

The agitator of my invention is particularly adapted for use in tillers and plows, but it is also useful any place where agitation of a substance is desired, for example in fertilizer spreaders, garden plows, cultivators and the like.

The spiral type and other single unit augers commonly used for tilling soil have certain disadvantages from the standpoints of both manufacture and actual use. For example, this type of apparatus must be heat treated and machined and the difficulties in heat treating and machining an elongated cutter when compared to the heat treatment of a single disc of material will be obvious to those skilled in the art. Furthermore, the assembly and handling is much more difficult with a continuous spiral cutter because of the weight and size involved.

An auger unit which has a continuous series of cutting surfaces is comparatively expensive to manufacture and when one of these elements fails in actual use, the entire unit must be replaced, thus adding to the operating expense.

From the standpoint of use, these large units or continuous spiral cutters, when moving through the ground, have a tendency to move or work sideways which necessitates the use of Coulter discs on the ends of the shaft to prevent such movement. Also, these units tend to clog when being moved through damp soil; it is necessary to sharpen the cutting edges from time to time, and there is a limitation on the size that can be used because of the tendency to vibrate.

All of these disadvantages, as well as others not specifically mentioned herein, have been overcome in my improved type of segmented disc apparatus where I provide a complete disc as a unit and then place a plurality of such discs on a rotatable shaft. The construction of each disc is such as to cause a digging-in or shaving of the disc into the substance through which it moves, whether the substance be soil, as would be the case in plows, tillers and cultivators, or the substance be something which is being spread or dispensed, such as fertilizers. The configuration of my improved discs is such as to cause the substance to be thrown outwardly against the adjacent disc and thus create a violent agitation or granulation of the substance.

The construction of the discs is also such that when the unit is moving through the soil it will displace the soil back and forth causing a type of emulsification thereof.

One of the principal objects of the present invention is to provide a novel type of disc for use on agitators and particularly plows, tillers, cultivators and the like which will result in improved operation on the substance through which the agitator moves.

Another main object of the invention is to produce a novel type of disc for use wherever it is desirable to cause an agitation of substances.

A further object of the invention is to provide an agitator disc which may be mounted angularly on a rotatable shaft and which is so constructed as to shave into the substance through which it is moved and throw the substance outwardly as the disc rotates.

Still another object of the invention is to provide an agitator disc which has concavo-convex, or dished, portions thereon which extend in opposite directions to this agitate and throw outwardly the substance through which it moves.

A still further object of the invention is to provide an assembly of a plurality of individual agitator discs on a common shaft resulting in a segmented disc agitator.

Another object of the invention is to provide a segmented disc agitator wherein a plurality of separate discs are mounted angularly on a rotatable shaft to rotate and move through a substance, whereby the substance will be agitated and thrown outwardly against adjacent discs and thus break up and granulate the substance.

Still another object of the invention is to provide a segmented disc agitator wherein a plurality of discs having opposed concavo-convex portions thereon are mounted angularly on a rotatable shaft but at different angles with respect to each other so that complete agitation and granulation of any substance through which the agitator is moved will take place.

Other objects and advantages of the invention will be apparent on reading the following description in conjunction with the accompanying drawings in which:

Fig. 1 is a side elevational view of the assembled segmented disc agitator;

Fig. 2 is an elevational view of one of the discs looking toward the right in Fig. 1 along the plane of line 2—2;

Fig. 3 is a vertical section taken substantially along the plane of line 3—3 of Fig. 2;

Fig. 4 is a somewhat diagrammatic representation of each of the seven discs shown in Fig.

1, showing their angular relation to each other on the shaft, and

Fig. 5 is a representation of the path of a point on the periphery of each of the discs shown in Fig. 1, showing the sine curves which would be made thereby if the assembly were rotated on a flat surface.

The complete agitation of a substance which I am able to accomplish by the use of my invention is primarily the result of the construction of each individual disc. As will appear more fully hereinafter, there is provided in each disc oppositely directed concavo-convex portions which tend to throw outwardly the substance in which the disc is rotated. Furthermore, each disc, in the assembled unit, is mounted at an angle with respect to the rotatable shaft to increase the digging-in or shaving action as well as the throwing out of the substance. I have found it desirable, from the standpoint of operation, to mount these discs so that each is at a different angle with respect to each other along the length of the shaft. The details of this type of construction will be described more fully hereinafter.

Referring now more particularly to the drawings, and especially to Fig. 1, the numeral 10 represents a common rotatable shaft upon which each of the discs is mounted. For purposes of illustration, I have shown seven such discs, but it will be understood that this number may be varied to suit the purposes for which the agitator may be used.

Referring for the moment to Figs. 2 and 3, the construction of each individual disc will become more apparent. The disc illustrated is indicated by the numeral 12 and is provided in one half thereof with a dished or concavo-convex portion 14 which, it will be noted, extends outwardly toward the left in Fig. 3. The other half has a concavo-convex portion 16 extending in the opposite direction. These portions of the disc may be easily formed by a stamping operation, or in any other desired manner.

The disc is provided with a cutting edge 18 around the periphery thereof and the entire disc is mounted on a hub 20 in such a way that a plane through the cutting edge of the disc will lie at an angle with respect to a vertical transverse plane through the shaft 10. The angle at which this disc is placed on the shaft may vary considerably. I have found by experimentation that the best results are obtained when this angle is between 10° and 20°, and for perhaps the best results, I have illustrated in the drawing the preferred angle which is 19°. This angle is clearly shown with respect to the left-hand disc in Fig. 1.

It will be evident that this angle could be different with respect to each disc, but this is not necessary and would involve more complicated manufacturing problems and, therefore, I prefer to mount the discs in such a way that when the hub 20 is placed within the central opening thereof, each disc will have the same angularity with respect to the shaft on which it is mounted.

The degree of curvature of the portions 14 and 16 may, of course, be also varied within wide limitations and still obtain satisfactory results. This curvature may also vary as the size of the disc varies, but for best results I have found that for a disc of, say 15″ in diameter, the radius of curvature of the concavo-convex portions should be approximately 12″.

In assembling a plurality of these discs on a common shaft, it is possible to obtain satisfactory agitating results if all of the discs are parallel with each other, but I have found in actual practice that when several of these discs are thus mounted there is a tendency toward vibration which can be eliminated by placing the discs at different angles with respect to each other. In other words, if a transverse plane through the center of the first disc which also passes through the deepest part of the concavo-convex portions is considered as 0° (this plane would coincide with a vertical longitudinal plane through the shaft in Fig. 1), then a similar plane passing through each of the other discs along the shaft should be at different angles with respect to a vertical longitudinal plane through the shaft.

This is illustrated more clearly in Fig. 4 where the discs are shown in their relation to each other as they appear along the length of the shaft.

The discs in Fig. 1 are numbered from one to seven, but it will be noted that these numbers are not in sequence for the reason that I prefer to place the discs so that their agitating operation from the first to the last disc will be in the order 1, 3, 2, 4, 6, 5, 7. If disc number 1 is considered to be at an angle of 0° with respect to a vertical longitudinal plane through the shaft, then disc number 3, which is the second disc, will be located so that a plane through the center thereof and the deepest part of each concavo-convex portion will lay at an angle of 240° with respect to a vertical longitudinal plane through the shaft. Likewise, disc number 2 will have a similar angle of 130°; disc number 4, an angle of 300°; disc number 6, an angle of 60°; disc number 5, an angle of 180°, and disc number 7, an angle of 120°. These angles, of course, can be varied with respect to each other, the angles given being merely for purposes of illustration, however, it is desirable that each of these angles be different in order to eliminate entirely any tendency toward vibration.

To illustrate still further the manner in which these discs are located with respect to each other, it will be clear that the concavo-convex portions will impart to the periphery of each disc a curve which will appear as a sine curve as the disc is rotated over a flat surface. Referring to Fig. 5, it will be noted that the distance between each of the lines 22 and 24 represents 180°. For disc number 1, which starts at 0°, the sine curve will be as indicated at 26. Disc number 3 starts 240° away from disc number 1 and its curve will be like that indicated by the numeral 28. The sine curves for the discs 2, 4, 6, 5, and 7 are indicated respectively by the numerals 30, 32, 34, 36, and 38. This will give an indication as to the order and manner in which the discs rotate and agitate the substance through which they move. As a result of the configuration of each disc and the manner in which it is mounted for rotation on the shaft, I have been able to obtain a sharp knifing action into the ground or other substance, which action is such as to be self-sharpening on the disc itself. As a matter of fact, it is not necessary that the periphery of these discs be sharpened before use because I have found that the shaving action into the ground will sharpen the discs. It is therefore unnecessary to remove any of the discs after use for sharpening purposes.

Each of the hubs 20 with a disc mounted thereon will be placed over the shaft 10 and will be secured individually to the shaft by means such as a shear bolt 40. One type of shear bolt which may be used is disclosed in my co-pending application, Ser. No. 673,411, filed May 31, 1946, although any other desirable type of fastening means may be used. If any one of the discs fails for any reason, it will be a comparatively simple matter to replace the individual disc, which is a great advantage over the continuous form of auger unit where it might become necessary to replace the entire cutting blade.

The arrangement of the discs on the shaft as shown in Fig. 1 makes it apparent that when the shaft revolves and moves through a substance, the discs will be sucked into the substance and when the agitator is used as a plow or similar device the sucking action is advantageous and it merely becomes necessary to provide some means such as wheels to keep the unit at a constant level. It will also be clear that the concavo-convex portions, together with the angular disposition of the discs on the shaft will cause the substance to be thrown upwardly and outwardly, since the speed of rotation of the shaft 10 is usually greater than the ground speed thereof. The substance will also be thrown in opposite directions. For example, consider disc number 1 as it appears in Fig. 1. As the disc begins to rotate, the dished portion thereof will cause the dirt to be thrown in one direction, but after it has rotated 180°, the substance will then be thrown in the opposite direction. With each disc having this type of action, the substance will be thrown against the adjacent disc and thus be thoroughly and violently displaced and will cause a granulation thereof.

It has been further discovered that, in testing this unit in both wet and dry soil conditions, no cloggage has been observed such as often occurs in the spiral or continuous cutting edge type of apparatus.

In the manufacture of each disc, the circular disc is first cut from a sheet, then heated and pressed into form in a die. The hub is then welded into the center of the disc and the entire unit heat treated. It has been found that this method of manufacture for a complete segmented disc agitator is considerably less expensive than the cost of a continuous cutting edge or spiral type of unit.

It is believed that the foregoing adequately describes the construction and advantages of the segmented disc agitator of my invention. It will be evident that certain changes in the form, construction and arrangement of parts may be made without in any way departing from the spirit of the invention or sacrificing any of the attendant advantages thereof. For example, the radius of curvature of the concavo-convex portions can be altered within certain limitations and the angle at which the discs are mounted on the shaft can also be modified within the limitations as described above. Furthermore, the individual discs can be made in two mating sections if desired, and clamped to the shaft by suitable clamping means.

Having thus described my invention what I claim as new and desire to secure by Letters Patent of the United States is:

1. An agitator disc, comprising a substantially circular plate having portions thereof at opposite sides of the center concavo-convex in opposite directions.

2. An agitator disc, comprising a substantially circular plate, one half of said plate being concavo-convex in one direction and the other half thereof being concavo-convex in the opposite direction.

3. An agitator disc, comprising a substantially circular plate, one half of said plate being concavo-convex in one direction and the other half thereof being concavo-convex an equal amount in the opposite direction.

4. A unit for a segmented disc agitator, comprising a hub, a disc mounted on said hub at an angle with respect thereto of from 10° to 20°, and a concavo-convex portion on said disc.

5. A unit for a segmented disc agitator, comprising a hub, a disc mounted on said hub at an angle with respect thereto, a concavo-convex portion in said disc on one side of said hub, and a concavo-convex portion in said disc in the opposite direction at the opposite side of said hub.

6. A unit for a segmented disc agitator, comprising a hub, a substantially circular disc mounted on said hub at an angle with respect thereto of from 10° to 20°, a concavo-convex portion in one half of said disc, and a similar concavo-convex portion in the opposite half of said disc extending in the opposite direction.

7. A segmented disc agitator, comprising a rotatable shaft, a plurality of individual substantially circular discs mounted angularly on said shaft, oppositely directed concavo-convex portions on opposite sides of the center of each of said discs, and each of said discs being mounted on said shaft at a different angle with respect to each other whereby the concavo-convex portions of adjacent discs will be out of phase with each other.

8. A segmented disc agitator, comprising a rotatable shaft, a plurality of individual substantially circular discs mounted angularly on said shaft, oppositely directed concavo-convex portions on each of said discs, and said discs being so mounted on said shaft that planes passing through the center of each disc and the concavo-convex portions thereof will each lie at a different angle with respect to a vertical plane through said shaft whereby the concavo-convex portions of adjacent discs will be out of phase with each other.

9. A segmented disc agitator, comprising a rotatable shaft, a plurality of individual substantially circular discs mounted on said shaft, a concavo-convex portion in one half of each of said discs, and a concavo-convex portion extending in the opposite direction in the other half of each disc, said discs being so mounted on said shaft that a plane through the circumference of each disc will lie at an angle of between 10° and 20° with respect to a transverse plane through said shaft and normal thereto, and planes through the center of each disc and the concavo-convex portions thereof will each lie at a different angle with respect to a longitudinal plane through said shaft whereby the concavo-convex portions of adjacent discs will be out of phase with each other.

10. A segmented disc agitator, comprising a rotatable shaft, a plurality of individual substantially circular discs mounted on said shaft, a concavo-convex portion in one half of each of said discs, and a concavo-convex portion extending in the opposite direction in the other half of each disc, said discs being so mounted on said shaft that planes through the circumference of each disc will each lie at the same angle with respect to a transverse plane through said shaft and normal thereto, and planes through the center of each disc and the concavo-convex portions thereof will each lie at a different angle with respect to a longitudinal plane through said shaft whereby the concavo-convex portions of adjacent discs will be out of phase with each other.

OSCAR C. BLOMGREN.

REFERENCES CITED

The following references are of record in the file of this patent:

UNITED STATES PATENTS

| Number | Name | Date |
|---|---|---|
| 1,635,612 | Dick et al. | July 12, 1927 |
| 2,256,185 | Ariens | Sept. 16, 1941 |

FOREIGN PATENTS

| Number | Country | Date |
|---|---|---|
| 123,862 | Great Britain | Mar. 13, 1919 |